United States Patent [19]

Scelia et al.

[11] 3,985,905
[45] Oct. 12, 1976

[54] DECAFFEINATED COFFEE OF IMPROVED AROMA AND FLAVOR

[75] Inventors: Richard P. Scelia, Tarrytown; Kenneth W. Fagan, Bronx, both of N.Y.; Michael G. Protomastro, Woodridge, N.J.

[73] Assignee: General Foods Corporation, White Plains, N.Y.

[22] Filed: June 24, 1974

[21] Appl. No.: 482,281

Related U.S. Application Data

[63] Continuation-in-part of Ser. No. 315,375, Dec. 15, 1972, abandoned.

[52] U.S. Cl. .............................. 426/427; 426/595; 426/432
[51] Int. Cl.² ............................................ A23F 1/08
[58] Field of Search .......... 426/386, 387, 427, 428, 426/481, 432, 434, 460, 466, 594, 595

[56] References Cited
UNITED STATES PATENTS

| | | | |
|---|---|---|---|
| 1,016,294 | 2/1912 | Rosewater | 426/434 X |
| 1,073,929 | 9/1913 | Rosewater | 426/434 X |
| 3,482,987 | 12/1969 | Pitchon et al. | 426/460 X |
| 3,655,399 | 4/1972 | Pitchon et al. | 426/434 X |

*Primary Examiner*—Frank W. Lutter
*Assistant Examiner*—N. Greenblum
*Attorney, Agent, or Firm*—Richard Kornutik

[57] ABSTRACT

The flavor and aroma of decaffeinated roasted and ground coffee is significantly improved employing a process whereby caffeine-containing green coffee material is initially contacted with water in a washing step at conditions which will not extract a significant amount of soluble materials from the coffee material. The aqueous solution obtained from the initial processing step is subsequently contacted with a decaffeinated coffee material.

6 Claims, No Drawings

DECAFFEINATED COFFEE OF IMPROVED AROMA AND FLAVOR

BACKGROUND OF THE INVENTION

This application is a Continuation-in-Part of Ser. No. 315,375, filed Dec. 15, 1972, now abandoned.

This invention relates to roasted and ground coffee and more particularly to decaffeinated roasted and ground coffee.

The prior art is replete with methods for producing decaffeinated roasted and ground coffee. Such methods have included water decaffeination of the beans, solvent decaffeination of the beans, water extraction of the beans with subsequent solvent extraction of the caffeine from the water extract, and other like methods. It has long been recognized, however, that, to varying degrees, the characteristic flavor and aroma of roasted and ground coffee is not present in the final decaffeinated product. Such deviations from undecaffeinated roasted and ground coffee may be brought about by the excessive hightemperature water treatment needed to remove caffeine from the green coffee material, the contact of the beans with solvent, the removal of desirable non-caffeine constituents either by water or by solvent, and the like.

Various attempts to more closely resemble the flavor and aroma of roasted and ground coffee are found in the prior art. Specifically, U.S. Pat. Nos. 1,016,294 and 1,073,929 describe methods whereby green beans are macerated with cold water for a substantial amount of time, the beans are decaffeinated, and a concentrated solution of the water used in the initial maceration step is added back to the decaffeinated beans. The method is designed to first remove desirable coffee constituents which would otherwise be removed during the decaffeination step and subsequent reincorporation of these constituents in the decaffeinated beans is claimed to result in an improved flavor.

It has been found that certain disadvantages are attended with prior art processes of this type. Apart from the substantial times (and therefore cost) involved, it is further found that such prolonged treatment, even under relatively mild conditions of temperature and pressure, has an adverse effect on the green beans such that the advantages of re-incorporating the solubles obtained in the soaking step are to some extent negated.

SUMMARY OF THE INVENTION

We have found that the flavor and aroma of decaffeinated roasted and ground coffee can be significantly improved and more nearly approximate that of un-decaffeinated coffee by a process employing the steps of first contacting caffeine-containing green coffee material with water in a washing operation at conditions which will not remove significant amounts of soluble materials from the green coffee material, and subsequently contacting a decaffeinated coffee material with the aqueous solution obtained from the initial water treatment step.

The conditions of the initial water washing step are such that the removal of caffeine from the green coffee material is avoided as nearly as possible. Still further, the conditions of temperature, pressure, and time are such that relatively insignificant extraction of green coffee solubles other than caffeine takes place; that is, the washing step is designed to remove certain loosely-held, surface-type constituents from the green coffee material without removing significant amounts of soluble materials from the interior of the green coffee material. It has suprisingly been found that the re-incorporation of constituents removed by treatment of the green coffee for such a relatively short time period greatly improves the aroma and flavor of the decaffeinated product. Apart from the significant time and cost savings over prior art processes attended with this discovery, it is found that the finished product is of generally better quality. It is theorized, that such quality improvements are a result of less severe treatment, in terms of contact time, which the green caffeine-containing material experiences.

The incorporating via contacting of the removed coffee constituents into decaffeinated green coffee material may be effected in a variety of ways. Addition may be either before or after roasting of the decaffeinated beans. When addition is to be made to roasted decaffeinated coffee, it has been found particularly effective to use the water containing the removed coffee constituents as the quench material at the end of the roasting cycle.

DETAILED DESCRIPTION OF THE INVENTION

In accordance with the process of this invention, caffeine containing green coffee material is first subjected to contact with water. The green coffee material may be whole or broken beans or subdivided beans. The material may be a blend of coffee varieties or a single variety of coffee. In an important aspect of this invention, it is found that the quality of poorer coffee types can be improved significantly according to the process of this invention and thereby improve the quality of the overall blend. Conversely, it may be desirable to treat only the higher quality coffee types according to this invention and thus preserve the higher quality coffee constituents.

The contacting of the green coffee material with water is preformed at conditions of temperature and pressure which will not extract a significant amount of caffeine or other solubles from the green coffee material. In order to avoid the removal of any significant amounts of caffeine during the initial water contacting step it is necessary to avoid the use of hot water since caffeine is normally extracted at such temperatures. Other green coffee constituents are soluble in cold water. In order not to extract a significant amount of these materials it is necessary that the contact time of green coffee material with water in the initial processing step be relatively short. Thus, the overall conditions in the initial washing step are such that relatively insignificant amounts of both caffeine and other green coffee solubles are removed. The terminology of relatively insignificant is merely intended to encompass the possibility that minor amounts of caffeine and other soluble materials may be removed.

Generally speaking, the temperature of the water necessary to avoid caffeine removal is in the range of about 40° F to about 80° F at atmospheric pressure.

The time for which the green coffee is contacted with the water will necessarily vary with the conditions at which water treatment is performed. A key to this invention, however, is the discovery that water contact of the coffee for relatively short periods of time is effective in removing those desirable constituents which greatly improve the aroma and flavor of the finished product when they are added back to a decaffeinated coffee. The value of this discovery is realized not only in a significant time and cost improvement over prior art processes, but also in an improved overall product.

Contact with water in the above-mentioned temperature range for substantial periods of time will effect extraction of certain green coffee constituents soluble at such temperatures. Thus, in order to avoid substantial amounts of this extraction, the water contact time in the initial processing step is relatively short. In general, we have found that contact times of from 3 to 15 minutes are useful, while preferred operating conditions are in the range of about 5 to 10 minutes.

The amount of water used is not critical, per se, so long as an amount is employed effective to remove the desired constituents. As a general consideration, since the green coffee material is found to absorb a weight of water approximately equal to its own weight, more than this amount of water is necessary in order to obtain a solution for incorporation onto a decaffeinated green coffee material. In general we have found that ratios in the range of about 2:1 to 4:1 water to coffee are particularly useful.

The water contacting of the green coffee material may be effected in a variety of methods such as immersion of the coffee in the water, passing the water through a stationary bed of coffee such as in an extraction column, and other like methods.

The solution of coffee constituents obtained may be more properly termed a dispersion or suspension of constituents and is generally of a rather dilute concentration. Surprisingly, however, the reincorporation of these constituents is found to significantly improve the final decaffeinated coffee product in that it is more nearly akin to its undecaffeinated counterpart.

After the green coffee is contacted with water in the above-described manner, the beans are separated from the aqueous solution of coffee constituents obtained in the initial water contacting step. Preferred means for accomplishing this separation are by decantation. It is found that centrifugation should be avoided since some of the desirable constituents are removed using this method. The green coffee is then subjected to decaffeination. Decaffeination may be accomplished by methods known in the art such as water decaffeination, solvent decaffeination, extract decaffeination with subsequent removal of the caffeine from the extract with a solvent, and other like processes.

It will be appreciated, of course, that the decaffeinated coffee material with which the aqueous solution of coffee constituents is contacted need not be the original coffee material treated in the initial washing step. Since the constituents obtained in the washing step would normally be lost in the decaffeination process, it is apparent that the removed constituents can be contacted with any coffee material which has undergone decaffeination, whether subjected to the initial washing step or not. Thus, depending upon certain processing requirements, it may be desirable to subject coffee material to the initial washing step of this invention, decaffeinate the thus treated coffee material, and subsequently reincorporate or contact the decaffeinated material with the constituents removed therefrom; or, an aqueous solution of the coffee constituents may be obtained from one batch of caffeine-containing green coffee material and subsequently contacted with a different batch of decaffeinated green coffee material which was either not subjected to the initial washing step yet is deficient in these constituents due to loss during the decaffeination process or was subjected to the initial washing step at some previous time.

The incorporation of the aqueous solution of coffee constituents obtained during the initial water contacting step into a decaffeinated green coffee may be accomplished in a variety of ways. Thus, in one embodiment of this invention, the aqueous solution remaining after the initial water treatment step and containing the coffee constituents may be added to the decaffeinated green coffee material prior to roasting. The wetted coffee material is then roasted and sub-divided to any desirable particle size. In another embodiment of this invention, the aqueous solution containing the coffee constituents may be added to the decaffeinated coffee material after the coffee has been roasted. The coffee material is then sub-divided and packaged. In a particularly useful method, the aqueous solution is used to quench the coffee material at the termination of the roast cycle.

In all the above embodiments, the aqueous solution may be applied to the decaffeinated coffee material in which it is recovered from the water contacting step of this process. While some concentrated form of the solution may be used, it is found that the evaporative methods of concentration generally have deleterious effects on the solution.

The amount of the aqueous solution added to the decaffeinated coffee material is not critical and optimum amounts may be readily determined by those skilled-in-the-art. Obvious factors upon which this determination is dependent are the amount of coffee constituents recovered in the water treatment step, whether the solution is applied in concentrated or dilute form, the desired final moisture content, and other like factors. In the preferred means of operation of this process, the amount of solution added back and the time of contact should be such that the water content of the decaffeinated material is increased anywhere from about 5 to 10%.

The water solution of coffee constituents may be applied to the decaffeinated coffee material either by immersion of the coffee in the solution, spraying the solution onto the coffee material as through an atomizer, and other well-known methods.

As previously mentioned, the green coffee material used in the process of this invention may be a blend of different varieties of green coffees or a single strain of green coffee. In a particularly preferred embodiment of this invention, we have found that green coffee of the Robusta variety is significantly upgraded employing the process of this invention. Generally, Robusta coffees are employed in a coffee blend not only because of their relatively low cost but also to impart a certain "harsh" note to the final coffee brew, which has been found desirable. Our experience has shown that this note is generally absent from decaffeinated coffees. By using the process of this invention, it has been found that the "harsh" notes characteristic of the Robusta coffees are present in the final coffee product making it more like its undecaffeinated counterpart.

The following examples are presented as illustrative of specific embodiments of this invention.

EXAMPLE I

One pound of undecaffeinated green Robusta coffee beans were stirred in a vessel with twice their weight of water at a temperature of 55° F for five minutes. The treatment water was decanted from the beans and was then added to a one pound batch of beans which had previously been decaffeinated. Contact was for one minute with stirring with the moisture content of the beans going from 11.4% to 20.0%. The wetted beans were then roasted and ground. Brew infusions using this treated product were found to be superior to infusions prepared from untreated decaffeinated beans. In particular it was found that the infusions of this invention displayed a "harsh" character generally lacking in decaffeinated coffees but present in most undecaffeinated brews.

EXAMPLE II

The procedure in Example I was followed in obtaining and recovering the treatment water. The treatment water was used to quench a 1 lb. roasted batch of previously undecaffeinated beans at the termination of the roast cycle by spraying 15 cc of the treatment water through an atomizer on the hot roasted beans. The beans were then ground and brewed. Again, the infusion prepared therefrom was found to be superior in aroma and flavor to its untreated counterpart.

While this invention has been particularly described with respect to the specific embodiments detailed in the above examples, the invention is not intended to be limited to such features. It is believed that various other embodiments and features are ascertainable by those skilled-in-the-art without departing from the scope and spirit of this invention.

What we claim is:

1. A process for producing decaffeinated coffee material having an aroma and flavor more nearly like undecaffeinated coffee, comprising the steps of:
    a. washing caffeine-containing green coffee material with water to remove loosely-held surface constituents therefrom and to form an aqueous solution of said constituents, said washing being performed at temperatures from about 40° F to about 80° F at atmospheric pressure for about 3 to 15 minutes whereby relatively insignificant amounts of both caffeine and other green coffee solubles are removed from said caffeine containing green coffee material, tne ratio of water to caffeine-containing coffee material being at least 2:1 by weight;
    b. separating said coffee material from said aqueous solution; and
    c. contacting a decaffeinated coffee material with said aqueous solution of coffee constituents.

2. The process of claim 1 wherein said decaffeinated coffee material of step (c) is decaffeinated green coffee.

3. The process of claim 1 wherein said decaffeinated coffee material of step (c) is roasted decaffeinated coffee.

4. The process of claim 3 wherein said aqueous solution is used to quench said roasted decaffeinated coffee material at the termination of the roast cycle.

5. The process of claim 4 wherein said green coffee material is Robusta coffee.

6. The process of claim 1 wherein said decaffeinated coffee material is the counterpart of the caffeine-containing green coffee material contacted in step (a).

* * * * *